United States Patent [19]
Galle et al.

[11] Patent Number: 6,082,402
[45] Date of Patent: Jul. 4, 2000

[54] METAL SEAL HYDRAULIC COUPLING

[75] Inventors: Gary Galle; Justin Whitehead, both of Houston, Tex.

[73] Assignee: ABB Vetco Gray, Inc., Houston, Tex.

[21] Appl. No.: 09/268,911

[22] Filed: Mar. 16, 1999

Related U.S. Application Data

[60] Provisional application No. 60/078,917, Mar. 20, 1998.
[51] Int. Cl.[7] ...................................................... F16L 37/28
[52] U.S. Cl. ...................... 137/614.04; 285/331; 285/917
[58] Field of Search ............................. 137/614.04, 614, 137/614.03; 285/331, 917

[56] References Cited

U.S. PATENT DOCUMENTS

| | | | |
|---|---|---|---|
| 4,660,869 | 4/1987 | Gabus | 285/331 X |
| 5,056,831 | 10/1991 | Ho | 285/331 X |
| 5,143,407 | 9/1992 | Cokeh | 285/331 X |
| 5,203,374 | 4/1993 | Smith, III . | |
| 5,339,861 | 8/1994 | Smith, III . | |
| 5,355,909 | 10/1994 | Smith, III . | |
| 5,360,035 | 11/1994 | Smith . | |
| 5,365,972 | 11/1994 | Smith, III . | |
| 5,370,153 | 12/1994 | Galle . | |
| 5,390,702 | 2/1995 | Smith, III . | |
| 5,469,887 | 11/1995 | Smith, III . | |
| 5,529,284 | 6/1996 | Berger | 285/917 X |
| 5,692,538 | 12/1997 | Smith, III . | |

*Primary Examiner*—Kevin Lee
*Attorney, Agent, or Firm*—Felsman, Bradley, Vaden, Gunter & Dillon, L.L.P.

[57] ABSTRACT

A hydraulic coupling having a lower tubular member and an upper tubular member for sealing engagement one with the other. The lower and upper members are maintained in axial engagement by an axial load. The lower member and the upper member each have an annular body having an axial bore therethrough for the passage of fluid. A metal, concentric inner annular seal leg and outer annular alignment leg extend from the body of the upper member, defining an annular sealing recess between the seal legs. An annular metal sealing portion or wall extends from the body of the lower member and has an inner diameter that defines a sealing surface for insertion into the sealing recess for sealingly engaging the inner annular seal leg. The sealing recess has a backup elastomer ring, which is axially compressed by the sealing portion. When the couplers are made up, the metal-to-metal seal is achieved due to an interference fit between the coupler halves. Because the seal is a straight-bore seal, the location of the final position of the couplers relative to one another can vary.

10 Claims, 1 Drawing Sheet

METAL SEAL HYDRAULIC COUPLING

CROSS-REFERENCE TO RELATED APPLICATIONS

This application claims the benefit of provisional application U.S. Ser. No. 60/078,917, filed on Mar. 20, 1998.

TECHNICAL FIELD

This invention relates in general to hydraulic couplings and in particular to a metal-to-metal seal for a hydraulic coupling.

BACKGROUND ART

Many current subsea hydraulic couplings employ elastomeric seal elements to effect a hydraulic seal. However, elastomeric seals are subject to wear and tear in coupling applications. Because of harsh operating conditions and the susceptibility of elastomeric seals to wear and tear, hydraulic couplings that employ elastomeric seals do not have a sufficiently long service life.

Some existing couplings employ metal-to-metal seals as primary seal elements. However, the metal seal hydraulic couplings built before this invention are complicated and employ very delicate seal elements such as metal o-rings, or metal face seals. Seals of this nature are particularly sensitive to misalignment, connection and disconnection at an angle, and debris. As a result of this sensitivity, relatively small manufacturing tolerances are required, which substantially increase cost. Also, when the metal seal elements of the couplings built before this invention wear out, the seal integrity is compromised, thereby further reducing the service life of the couplings.

DISCLOSURE OF INVENTION

It is the general object of the invention to provide a metal-to-metal seal for use in a subsea hydraulic coupling that results in a coupling that has a long service life and that is insensitive to misalignment, connection and disconnection at an angle, and debris.

The hydraulic coupling has a lower member and an upper member for sealing engagement one with the other. The lower and upper members are maintained in axial engagement by an axial load. The lower member and the upper member each have an annular body having an axial bore therethrough for the passage of fluid. A metal, concentric inner annular seal leg and outer annular alignment leg extend from the body of the upper member, defining an annular sealing recess between the seal legs. The seal legs have walls that define upper sealing surfaces. An annular metal sealing portion extends from the body of the lower member and has an inner wall that defines a sealing surface for insertion into the sealing recess for sealingly engaging the inner annular seal leg. The axial load through the lower and upper members is supported through the lower and upper sealing surfaces. Concentric inner and outer seal legs on the upper member provide a recess for a backup elastomer o-ring.

When the couplers are made up, the metal-to-metal seal is achieved due to an interference fit between the coupler halves. The seal on the tree side coupler is silver-plated to aid in lubrication and sealing. Because the seal is a straight-bore seal, the location of the final position of the couplers relative to one another can vary. This improved design results in a hydraulic coupling that has a long service life and that is insensitive to misalignment, connection and disconnection at an angle, and debris. The only stipulation is that the squeeze on the back-up elastomer be reasonable. It has been found that the final position of couplers can vary by 0.060", and the resulting o-ring squeeze can vary from 10.8 to 35.9 percent. When assembled, the spring in the coupler will exert 400 lb. of force. With a sealing diameter of 0.76", the spring will hold back an external pressure of 880 psi.

BEST MODE FOR CARRYING OUT THE INVENTION

Figure 1:
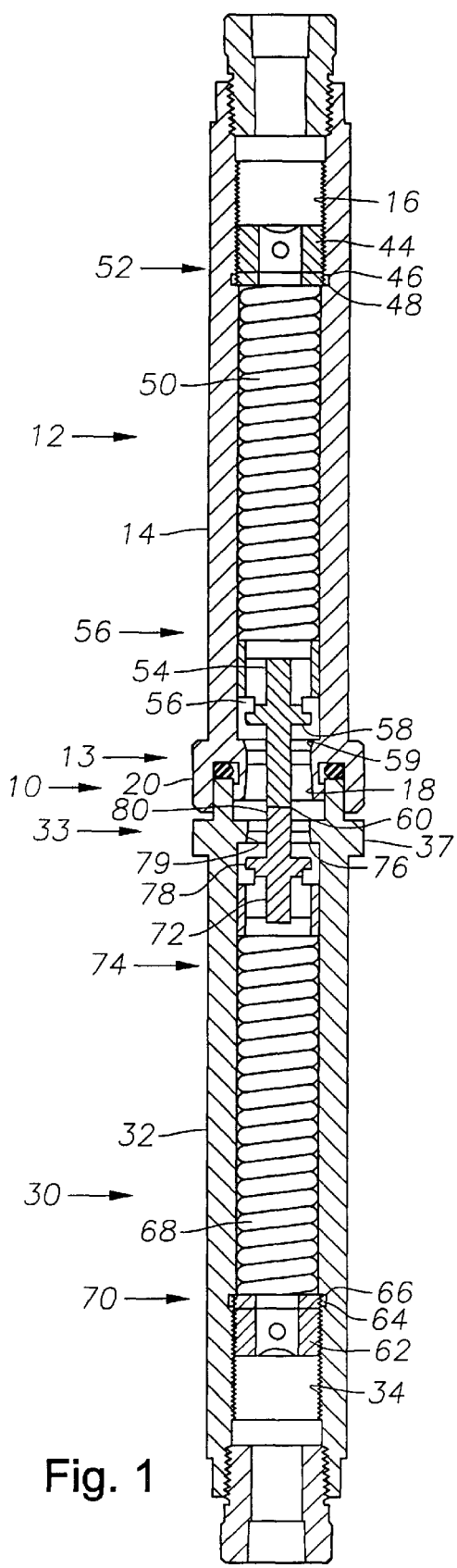
FIG. 1 is a vertical sectional view illustrating the coupling of this invention.

Referring to FIG. 1, hydraulic coupling 10 is a hydraulic coupling of the type used in subsea oil and gas production operations. Coupling 10 serves to sealingly couple the ends of two pipes (not shown) carrying hydraulic fluid.

Figure 2:
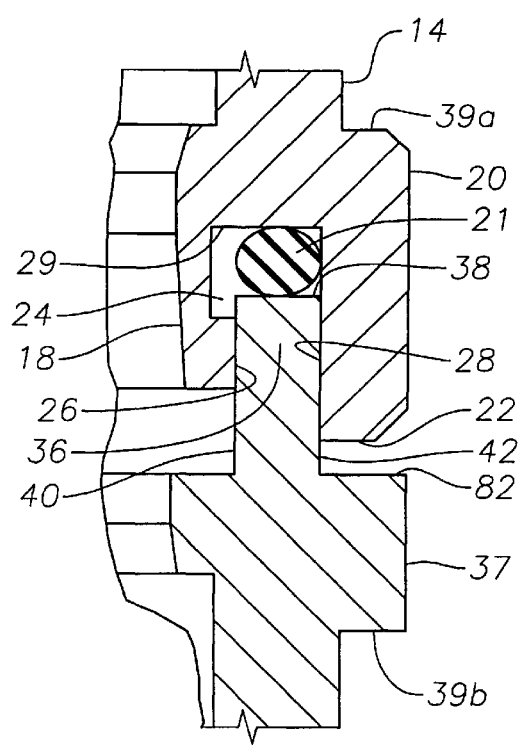
FIG. 2 is an enlarged vertical sectional view of the coupling of FIG. 1.

Referring now to both FIGS. 1 and 2, coupling 10 has an upper member 12 for threaded connection to one of the pipe ends that is to be sealingly coupled. Upper member 12 has body 14 having an axial bore 16 therethrough for the passage of fluid. A metal inner annular seal leg 18 extends from a mating end 13 of body 14 of upper member 12. Also extending from body 14 is metal outer annular alignment leg 20 having a rim 22. Outer alignment leg 20 is thicker and has more rigidity than inner seal leg 18.

Inner seal leg 18 extends concentrically within outer alignment leg 20. Inner seal leg 18 and outer alignment leg 20 define between them an annular sealing recess or cavity 24. A spring member, preferably an elastomeric ring 21 locates within cavity 24. A seal surface 26 is located on inner seal leg 18 and an inward facing opposed wall 28 is located on outer alignment leg 20. Seal surface 26 is cylindrical and is a metal-to-metal seal. Inner seal leg 18 has a thinner cross-sectional area located above seal surface 26 to allow slight flexing and an interference engagement. Separating opposed walls 26 and 28 is a downward facing, flat base 29.

Referring still to both FIGS. 1 and 2, coupling 10 further has a lower member 30 for threaded connection to the other of the hydraulic pipe ends that is to be sealingly coupled. Lower member 30 has a body 32 and an axial bore 34 thorogh for the passage of fluid. An annular metal sealing portion 36 extends from a mating end 33 of body 32 of lower member 30 proximate flange 37. Sealing portion 36 has a rim 38. Sealing portion 36 has an inner wall 40 and outer wall 42. Inner wall 40 is a straight cylindrical bore which receives seal surface 26. Preferably, wall 40 is silver-plated to aid in lubrication and in sealing.

Referring now mainly to FIG. 1, a biasing plug 44 is positioned within axial bore 16 of body 14 of upper member 12. In the preferred embodiment, biasing plug 44 has a collar 46 that fits within annular recess 48. Biasing plug 44 biases spring 50 and is in contact with fixed end 52 of spring 50. Coupler poppet 54 is slidingly received within axial bore 16 of upper member 12 and is biased against free end 56 of spring 50. Coupler poppet 54 is provided with flow-by slots 56 to allow fluid to pass therethrough. Coupler poppet 54 has formed thereon a valve flange 58 to contact valve seat 59 for closing off the axial bore 16 of upper member 12. Coupler poppet 54 also possesses a downward facing tip 60.

A biasing plug 62 is positioned within axial bore 34 of body 32 of lower member 30. In the preferred embodiment, biasing plug 62 has a collar 64 that fits within annular recess 66. Biasing plug 62 biases spring 68 and is in contact with fixed end 70 of spring 68. Coupler poppet 72 is slidingly received within axial bore 34 of lower member 30 and is biased against free end 74 of spring 68. Coupler poppet 72 is provided with flow-by slots 76 to allow fluid to pass therethrough. Coupler poppet 72 has formed thereon a valve flange 78 to contact valve seat 79 for closing off the axial bore 34 of lower member 30. Coupler poppet 72 also possesses an upward facing poppet tip 80.

Coupling 10 operates as follows. The end of a stationary hydraulic line (not shown) is threadingly attached to lower member 30, which in turn fixedly coupled to a permanent installation such as a manifold or tree, (not shown), which is located at the sea bottom. The end of a retrievable hydraulic line (not shown) is threadingly attached to the end of upper member 12. Upper member 12 is lowered to the sea bottom and positioned such that upper body 14 is in substantial axial alignment and in proximate vicinity of the stationary base. Upper member 12 stabs over lower member 10, with seal surface 26 slidingly engaging inner wall 40 of annular metal sealing portion 36. Elastomer 21 is squeezed between base 29 and rim 38, forming a secondary seal between base 29 and rim 38. When lower member 30 and upper member 12 are connected, a gap 82 remains between rim 22 and flange 37. The squeeze on elastomer 21 may vary from 10.8–35.9%. Therefore, the axial dimension of elastomer 21 may vary along with the dimension of gap 82, which may vary about 0.060". The axial load on the upper member 12 is transferred through the elastomeric ring 21 to the lower member 30.

Referring now to FIG. 1, the coupler poppet assemblies ensure that hydraulic fluid is not lost while upper and lower members 12 and 30 are not coupled. When upper member 12 and lower member 30 are not coupled, valve flanges 58 and 78 of coupler poppets 54 and 72 are forced into sealing contact with valve seats 59 and 79 so that fluid cannot flow out of upper member 12. During connection of lower member 30 and upper member 12, poppet tip 60 of coupler poppet 54 comes into contact with poppet tip 80 of coupler poppet 72. As the lower and upper members 30 and 12 are brought further together, coupler poppet 72 is displaced axially within lower member 30, and coupler poppet 54 is displaced axially within upper member 12, thus causing valve flanges 58 and 78 to disengage valve seats 59 and 79, respectively. When valve flanges 58 and 78 disengage valve seats 59 and 79, hydraulic fluid in upper member 12 can flow through and out of or into upper member 12. Similarly, the fluid in lower member 30 can flow through the coupler poppet assemblies and out of or into lower member 30.

One advantage of the invention is that the coupler has an equivalent flow area of more than a 0.500" diameter hole. Therefore, the coupler is a true 0.5" coupler having no pressure losses. Additionally, the hydraulic coupler provides a metal-to-metal seal and an elastomeric backup.

While the invention has been shown in only one of its forms, it should be apparent to those skilled in the art that it is not so limited, but is susceptible to changes without departing from the scope of the invention.

What is claimed is:

1. A hydraulic coupling between a first tubular member and a second tubular member, the tubular members having a common axis comprising:

an outer annular leg on a mating end of the first tubular member;

an inner annular leg on said mating end of the first tubular member, said outer and inner annular legs being joined to each other by a base that faces the matable end of said second tubular member, said inner and said outer leg and said base defining an annular cavity therebetween, wherein said inner annular leg has an outwardly facing seal surface;

a spring member in said annular cavity in contact with said base and spaced axially from said outwardly facing seal surface; and an annular wall protruding from a mating end of the second tubular member and inserted between said outer annular leg and said inner annular leg, said annular wall having a distal end in engagement with said spring member, wherein said outwardly facing seal surface sealingly engages a seal surface formed on an inner diameter portion of said annular wall forming a metal-to-metal seal.

2. The hydraulic coupling according to claim 1 further comprising:

a first biasing plug in said first tubular member a distance away from said mating end;

a first valve seat on an inside of said first tubular member proximate said mating end;

a first coupler poppet having a first and a mating end, said first coupler poppet located in said first tubular member proximate said mating end of said first tubular member, said first coupler poppet having a first valve flange between said first end and said mating end;

a spring between said biasing plug and said first coupler poppet for biasing said valve flange against said first valve seat;

a second biasing plug in the second tubular member a distance away from said mating end;

a second valve seat on an inside of said second tubular member proximate said mating end;

a second coupler poppet having a first end and a mating end, said second coupler poppet located in said second tubular member proximate said mating end of said tubular member, said second coupler poppet having a second valve flange between said first end and said mating end;

a spring between said biasing plug and said second coupler poppet for biasing said second valve flange against said second valve seat;

said mating end of said first coupler poppet and said mating end of said second coupler poppet for engagement when the first tubular member and the second tubular member engage so that said first coupler poppet is forced out of engagement with said first valve seat and second coupler poppet is forced out of engagement with said second valve seat.

3. The hydraulic coupling according to claim 1 wherein: one of said seal surfaces protrudes radially toward said other seal surface.

4. The hydraulic coupling according to claim 1 wherein: said spring member is an elastomeric ring which forms a secondary seal, wherein said elastomeric ring is compressed by a distal end of said sealing annular wall in an amount between approximately 10 to 36 percent when said first tubular member and said second tubular member are mated, thereby allowing for variance in a mating position of the tubular members.

5. The hydraulic coupling according to claim 1 wherein said inner annular leg has a thinner cross-section than said outer annular leg to allow flexing when the first and second tubular members are coupled together.

6. The hydraulic coupling according to claim 1 wherein:

said outer annular leg has an inner diameter that engages an outer diameter of said annular wall.

7. A hydraulic coupling between a first tubular member and a second tubular member comprising:

an outer annular leg on a mating end of the first tubular member;

an inner annular leg on said mating end of the first tubular member, said inner annular leg having a radially outwardly protruding rim defining an outwardly facing seal surface, said inner and said outer leg defining an annular cavity therebetween, said annular cavity defining a base;

an elastomeric ring in said annular cavity in contact with said base and spaced axially from said seal surface; and an annular wall protruding from a mating end of the second tubular member inserted between said outer annular leg and said inner annular leg, said annular wall having an inner diameter and a distal end, said distal end in engagement with said elastomeric ring, said inner diameter in sealing engagement with said seal surface of said radially inwardly protruding rim on said inner annular leg.

8. A method of forming a seal that allows for misalignment comprising the steps of:

providing a first tubular member having a mating end with an outer annular leg and an inner annular leg, said inner and said outer annular legs defining an annular cavity therebetween with a base that faces said second tubular member;

placing an elastomeric ring in said annular cavity;

providing a second tubular member having an annular wall protruding from a mating end of the second tubular member, said annular wall having a distal end thereof;

inserting said annular wall between said inner annular leg and said outer annular leg without rotation, forming a primary metal-to-metal seal between an inner diameter portion of said annular wall and an outer diameter portion of said inner annular leg; and compressing said elastomeric ring with said distal end of said annular wall, forming a secondary seal.

9. The method of forming a seal according to claim 8, wherein:

said step of compressing results in an elastomeric ring squeeze that compresses said elastomeric ring between approximately 10 to 36 percent, thereby providing a variance in a final position of said first tubular member relative to said second tubular member.

10. The method of forming a seal according to claim 8 further comprising the steps of:

biasing a first valve flange on a first coupler poppet against a first valve seat in said first tubular member;

biasing a second valve flange on a second coupler poppet against a second valve seat in said second tubular member;

contacting a mating end of said first coupler poppet with a mating end of a second coupler poppet when mating said first tubular member and said second tubular member;

lifting said first valve flange on said first coupler poppet off of said first valve seat in said first tubular member and lifting said second valve flange on said second coupler poppet off of said second valve seat in said second tubular member when said mating end of said first coupler poppet and said mating end of said second coupler poppet are engaging so that flow may occur between said first tubular member and said second tubular member.

* * * * *